United States Patent
Ping et al.

(10) Patent No.: US 9,588,880 B2
(45) Date of Patent: Mar. 7, 2017

(54) ADAPTIVE ADDRESS TRANSLATION METHOD FOR HIGH BANDWIDTH AND LOW IR CONCURRENTLY AND MEMORY CONTROLLER USING THE SAME

(75) Inventors: Te-Lin Ping, Hsinchu (TW); Han-Chiang Su, Taipei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 676 days.

(21) Appl. No.: 13/116,751

(22) Filed: May 26, 2011

(65) Prior Publication Data

US 2011/0296134 A1    Dec. 1, 2011

(30) Foreign Application Priority Data

May 28, 2010 (TW) ................................ 99117327 A

(51) Int. Cl.
*G06F 12/02* (2006.01)

(52) U.S. Cl.
CPC .................. *G06F 12/02* (2013.01)

(58) Field of Classification Search
CPC ....... G06F 12/02; G06F 9/3885; G06F 9/3891

USPC .......................................... 711/202
See application file for complete search history.

(56) References Cited

U.S. PATENT DOCUMENTS

| | | | | |
|---|---|---|---|---|
| 5,410,664 A | * | 4/1995 | Brooks et al. | 711/202 |
| 5,535,354 A | * | 7/1996 | Reiff | 711/217 |
| 6,205,511 B1 | * | 3/2001 | Wen | 711/5 |
| 7,805,587 B1 | * | 9/2010 | Van Dyke et al. | 711/202 |
| 7,945,760 B1 | * | 5/2011 | Barry et al. | 711/202 |

FOREIGN PATENT DOCUMENTS

TW    200412496 A    7/2004

* cited by examiner

*Primary Examiner* — Michael Alsip
(74) *Attorney, Agent, or Firm* — Rabin & Berdo, P.C.

(57) ABSTRACT

An adaptive memory address translation method includes the following steps. Multiple request instructions are received. A memory address corresponding to each request instruction includes a bank address. The memory addresses corresponding to the request instructions are translated, such that the bank addresses corresponding to at least one part of the any two adjacent request instructions are different. A numerical translation is utilized to translate the memory addresses corresponding to the request instructions, such that the memory addresses corresponding to the any two adjacent request instructions have less different bits.

6 Claims, 5 Drawing Sheets

Bank address A

| Access address#1 Bank address=0 | Access address#5 Bank address=1 | . . . |
|---|---|---|
| ⋮ | | |

Field 1

| Access address#2 Bank address=3 | Access address#6 Bank address=0 | . . . |
|---|---|---|
| ⋮ | | |

Field 2

| Access address#3 Bank address=2 | Access address#7 Bank address=3 | . . . |
|---|---|---|
| ⋮ | | |

Field 3

| Access address#4 Bank address=1 | Access address#8 Bank address=2 | . . . |
|---|---|---|
| ⋮ | | |

Field 4

FIG. 7

| Access address#1 Bank address=0 |
|---|
| Access address#2 Bank address=0 |
| Access address#3 Bank address=1 |
| Access address#4 Bank address=2 |
| Access address#5 Bank address=3 |
| Access address#6 Bank address=1 |
| Access address#7 Bank address=0 |
| Access address#8 Bank address=3 |
| ⋮ Block |

FIG. 8

| Request instruction | Memory address | |
|---|---|---|
| | Before translation | After translation |
| 1 | 00 0000 0000 | 00 0000 0000 |
| 2 | 00 0000 0001 | 00 0000 0001 |
| 3 | 00 0000 0010 | 00 0000 0011 |
| ⋮ | ⋮ | ⋮ |
| 128 | 00 0111 1111 | 00 0100 0000 |
| 129 | 00 1000 0000 | 00 1100 0000 |
| ⋮ | ⋮ | ⋮ |
| 256 | 00 1111 1111 | 00 1000 0000 |
| 257 | 01 0000 0000 | 01 1000 0000 |
| ⋮ | ⋮ | ⋮ |
| 512 | 01 1111 1111 | 01 0000 0000 |
| 513 | 10 0000 0000 | 11 0000 0000 |
| ⋮ | ⋮ | ⋮ |

FIG. 9

ADAPTIVE ADDRESS TRANSLATION METHOD FOR HIGH BANDWIDTH AND LOW IR CONCURRENTLY AND MEMORY CONTROLLER USING THE SAME

This application claims the benefit of Taiwan application Serial No. 99117327, filed May 28, 2010, the subject matter of which is incorporated herein by reference.

BACKGROUND OF THE INVENTION

Field of the Invention

The invention relates in general to an adaptive memory address translation method and a memory controller using the same, and more particularly to an adaptive memory address translation method applied to a high bandwidth and low voltage system and a memory controller using the same.

Description of the Related Art

When data are read from or written into a memory, the data cannot be accessed until the steps of activating, instruction reading/writing and pre-charging are successively performed. When the access address of the memory is switched, whether the page address and the bank address are hit or not affects the performance of the overall system.

FIG. 1 (Prior Art) is a schematic illustration showing an example of accessing a memory. FIG. 2 (Prior Art) is a timing chart showing access instructions of FIG. 1. In FIG. 1, if the data at the bank address C and the page address D are to be firstly accessed, and then the data at the bank address E and the page address F are to be accessed, then the condition that the page address is not hit and the bank address is not hit may occur. Because the next page address to be accessed is at a different bank address, after the activating step is performed at the bank address C, as shown in FIG. 2, the memory can first activate the bank address E in a pipeline manner to decrease the loss of the system performance.

However, if the condition that the page address is not hit but the bank address is hit occurs, the loss of the system performance may occur. FIG. 3 (Prior Art) is a schematic illustration showing another example of accessing the memory. FIG. 4 (Prior Art) is a timing chart showing access instructions of FIG. 3. In FIG. 3, if the data at the bank address A and the page address A are to be accessed firstly and then the data at the bank address A and the page address B are to be accessed, then the condition that the page address is not hit but the bank address is hit may occur. Because the memory has to pre-charge the page address A in the bank address A and then re-activate the next page address B to be accessed, the activating step shown in FIG. 4 cannot be hidden in the pipeline manner, and the system performance is decreased.

Consequently, the arrangement of the memory addresses relates to whether the overall system can effectively access the memory, so that the performance of the overall system is affected.

In addition, the memory receives the memory address in a single-end signaling manner. So, when the continuous memory addresses, received by the memory, need to carry, most bits simultaneously change to cause the instantaneously significant change of the current, and thus affect the electric property, such that the translation speed between the logic 1 and logic 0 is decreased. This causes the memory to sample the incorrect memory address and disables the memory from normally working in the higher working speed.

SUMMARY OF THE INVENTION

The invention is directed to an adaptive memory address translation method and a memory controller, wherein the memory addresses are translated and coded again to reduce the conditions that the page address is not hit but the bank address is hit, such that the difference between the memory addresses the bank address is not hit corresponding to the adjacent request instructions is reduced. So, the invention may be applied to a high bandwidth and low voltage system.

According to a first aspect of the present invention, an adaptive memory address translation method is provided. The method includes the following steps. Request instructions are received, wherein a memory address corresponding to each of the request instructions comprises a bank address. The memory addresses corresponding to the request instructions are translated such that the bank addresses corresponding to at least one part of the any two adjacent request instructions are different. A numerical translation mechanism is utilized to translate the memory addresses corresponding to the request instructions, such that the memory addresses corresponding to the any two adjacent request instructions have less different bits.

According to a second aspect of the present invention, a memory controller including a first translation unit and a second translation unit is provided. The first translation unit receives request instructions. A memory address corresponding to each of the request instructions comprises a bank address. The first translation unit further translates the memory addresses corresponding to the request instructions, such that the bank addresses corresponding to at least one part of the any two adjacent request instructions are different. The second translation unit utilizes a numerical translation mechanism to translate the memory addresses corresponding to the request instructions, such that the memory addresses corresponding to the any two adjacent request instructions have less different bits.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 7 is a schematic illustration showing an example of a memory address, translated according to a de-interlacing instruction according to the preferred embodiment of the invention.

FIG. 8 is a schematic illustration showing a memory address, translated according to a MPEG control instruction, according to the preferred embodiment of the invention.

FIG. 9 is a schematic illustration showing an example of a memory address, Gray-code translated according to a request instruction, according to the preferred embodiment of the invention.

DETAILED DESCRIPTION OF THE INVENTION

The invention provides an adaptive memory address translation method and a memory controller, wherein the memory addresses are translated and coded again to reduce the conditions that the page address is not hit but the bank address is hit, such that the difference between the memory addresses corresponding to the adjacent request instructions is reduced. So, the invention may be applied to a high bandwidth and low voltage system.

Figure 1:
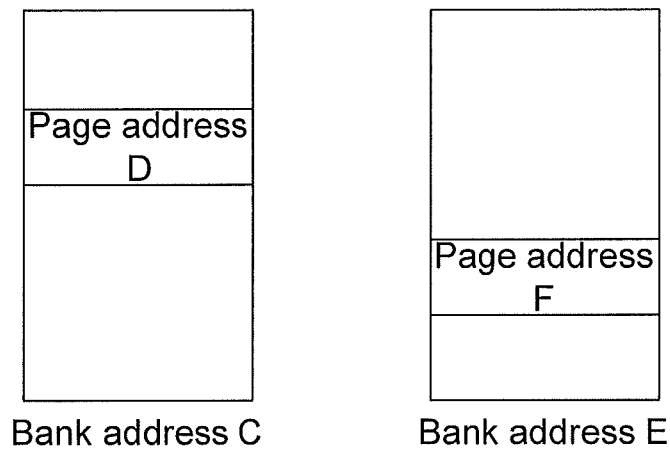
FIG. 1 (Prior Art) is a schematic illustration showing an example of accessing a memory.
Figure 2:
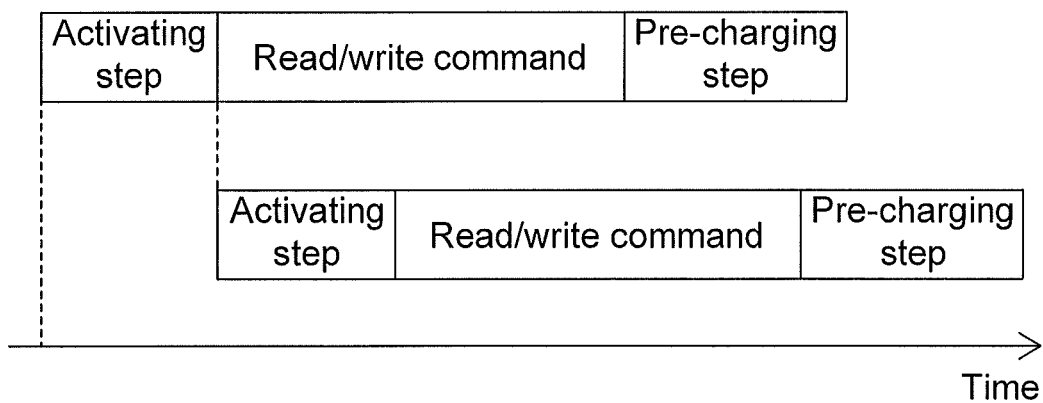
FIG. 2 (Prior Art) is a timing chart showing access instructions of FIG. 1.
Figure 3:
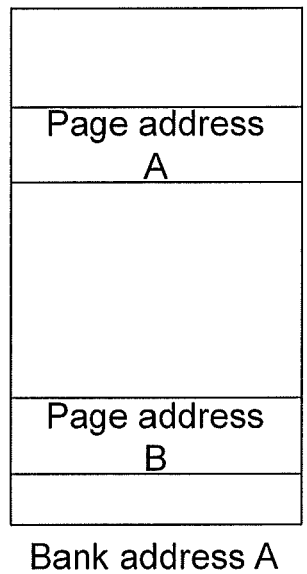
FIG. 3 (Prior Art) is a schematic illustration showing another example of accessing the memory.
Figure 4:
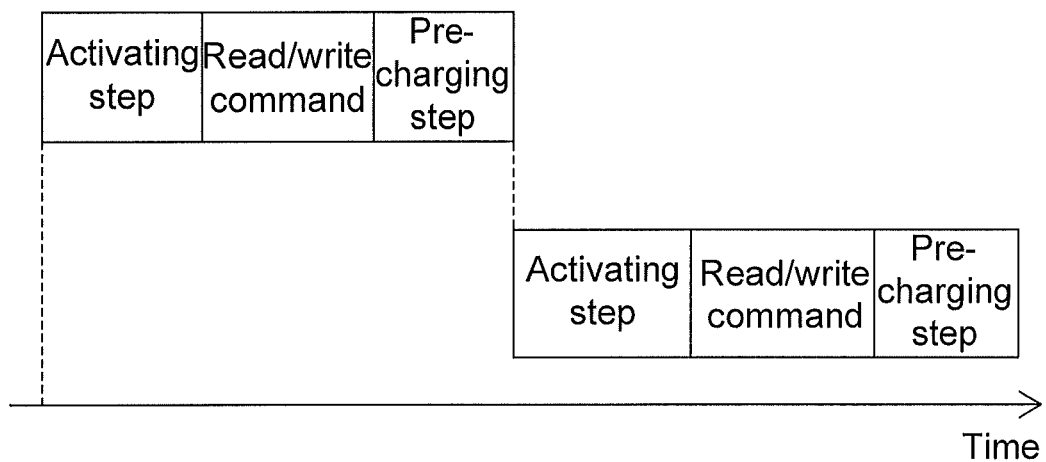
FIG. 4 (Prior Art) is a timing chart showing access instructions of FIG. 3.
Figure 5:
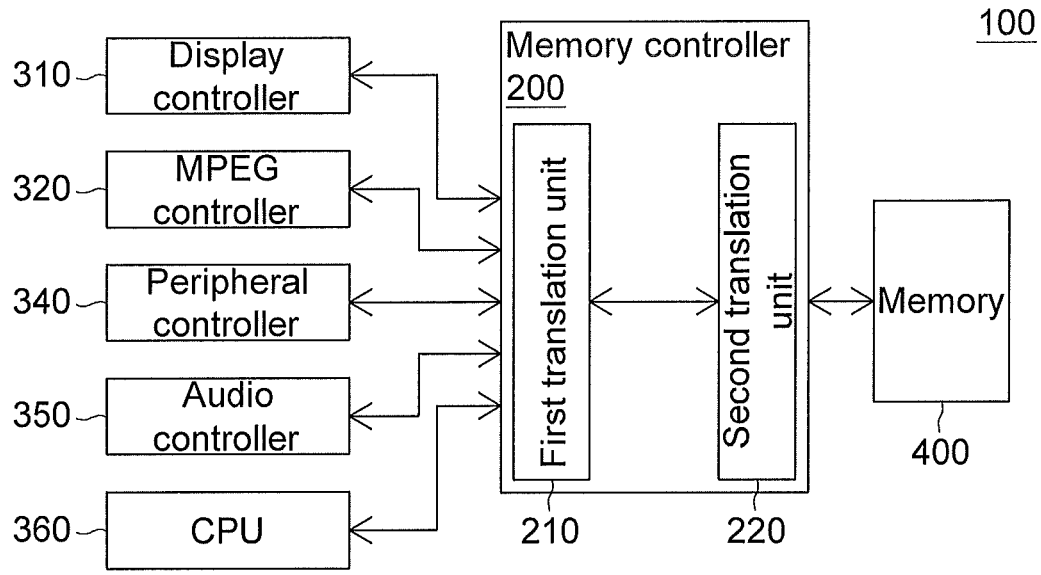
FIG. 5 is a block diagram showing a memory controller according to a preferred embodiment of the invention.

FIG. 5 is a block diagram showing a memory controller 200 according to a preferred embodiment of the invention. As shown in FIG. 5, the memory controller 200 is disposed in an image processing system 100, such as a digital television system, and will be described as a non-restrictive example of the invention. In the image processing system 100, the memory controller 200 receives request instructions, coming from a display controller 310, a MPEG controller 320, a peripheral controller 340, an audio controller 350 or a central processing unit (CPU) 360, for example, to perform a data accessing operation on an memory 400. The memory 400 is, for example, a double data rate synchronous dynamic random access memory (DDR SDRAM), which does not intend to limit the invention.

The memory controller 200 includes a first translation unit 210 and a second translation unit 220. The first translation unit 210 receives multiple request instructions. The memory address of the memory 400 corresponding to each request instruction includes a bank address. The first translation unit 210 translates the memory addresses corresponding to these request instructions, such that the bank addresses corresponding to at least one part of the any two adjacent request instructions are different. The second translation unit 220 utilizes a numerical translation mechanism to translate the memory addresses of the memory 400 corresponding to the request instructions, such that the fluctuated bit number of the memory addresses corresponding to the any two adjacent request instructions is decreased as compared with that without the numerical translation.

Figure 6:
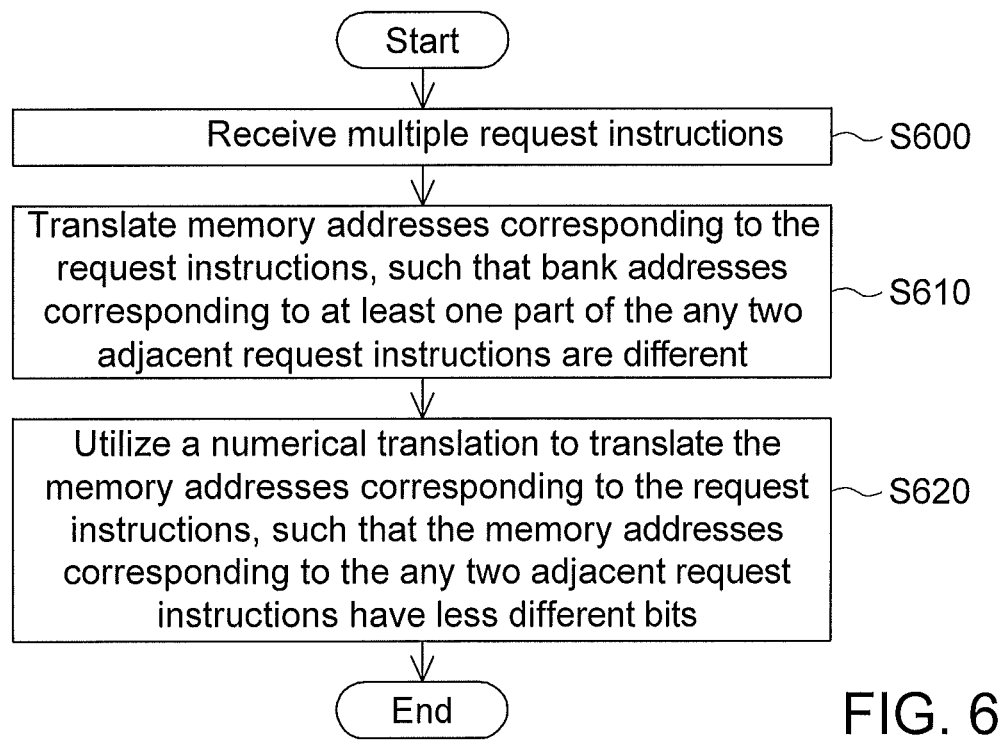
FIG. 6 is a flow chart showing an adaptive memory address translation method according to a preferred embodiment of the invention.

FIG. 6 is a flow chart showing an adaptive memory address translation method according to a preferred embodiment of the invention. In step S600, the memory controller 200 receives multiple request instructions, each of which includes a read/write command and a memory address where data are to be read/written. The memory address includes a bank address and a page address. In step S610, the first translation unit 210 translates the memory addresses corresponding to the request instructions, such that the bank addresses corresponding to at least one part of the any two adjacent request instructions are different. Consequently, the conditions that the bank addresses are not hit are increased, so that the conditions that the page address is not hit but the bank address is hit may be decreased. Thus, the memory controller 200 can handle the adjacent request instructions in a pipeline manner to decrease the loss of the system performance.

In the image processing system 100 of FIG. 5, the display controller 310 and the MPEG controller 320 pertain to the elements that occupy a lot of system bandwidths. The properties of the memory addresses corresponding to the request instructions will be analyzed by taking the display controller 310 and the MPEG controller 320 and the frame with the resolution of 1920×1080 as an example. However, the invention is not limited thereto, and the same analysis may be applied to the request instructions of other elements in the system according to the design requirements.

Regarding the display controller 310, the de-interlacing instruction outputted from a deinterlacer of the display controller 310 occupies the maximum system bandwidth among the request instructions outputted therefrom. Because the deinterlacing operation needs to process four fields of data at the same time, the memory 400 needs to store four continuous fields of data to be alternately read by the deinterlacer, wherein the size of each field is equal to 1920×2×540+512=2,074,112 bytes. Consequently, the memory addresses corresponding to de-interlacing instructions differ from each other by 2,074,112 bits. Table 1 lists the memory addresses corresponding to the de-interlacing instructions.

TABLE 1

| De-interlacing instruction | Memory address |
|---|---|
| 1 | 000 0000 0000 0000 0000 0000 |
| 2 | 001 1111 1010 0110 0000 0000 |
| 3 | 011 1111 0100 1100 0000 0000 |
| 4 | 101 1110 1111 0010 0000 0000 |
| 5 | 000 0000 0000 0010 0000 0000 |
| 6 | 001 1111 1010 1000 0000 0000 |
| 7 | 011 1111 0100 1110 0000 0000 |
| 8 | 101 1110 1111 0100 0000 0000 |
| ... | ... ... ... ... ... ... |

Analyzing the memory addresses corresponding to the de-interlacing instructions in Table 1, it is found that the $9^{th}$ bit and the $10^{th}$ bit counted from the least significant bit (LSB) frequently change in the order of 00→11→10→01→01→00→11→10. The translation is most frequent, and the $7^{th}$ and $8^{th}$ bits are equal to 0.

The MPEG controller 320 accesses the memory 400 with one block serving as one unit. When the MPEG controller 320 reads the block, having the size of 16×16, from the memory 400, 16 MPEG control instructions have to be transmitted to the memory controller 200, and the memory addresses corresponding to the adjacent MPEG control instructions differ by 1920 bits. Table 2 is an example listing the memory addresses corresponding to the MPEG control instructions.

TABLE 2

| MPEG control instruction | Memory address |
|---|---|
| 1 | 00 0000 0000 0000 |
| 2 | 00 0111 1000 0000 |
| 3 | 00 1111 0000 0000 |
| 4 | 01 0110 1000 0000 |

TABLE 2-continued

| MPEG control instruction | Memory address |
|---|---|
| 5 | 01 1110 0000 0000 |
| 6 | 10 0101 1000 0000 |
| 7 | 10 1101 0000 0000 |
| 8 | 11 0100 1000 0000 |
| ... | ... ... ... ... |

Analyzing the memory addresses corresponding to the MPEG control instructions in Table 2, it is found that the $7^{th}$ bit and the $8^{th}$ bit counted from the least significant bit (LSB) frequently change in the order of 00→11→10→01→00→11→10→01. The translation is more frequent, the $9^{th}$ and $10^{th}$ bits successively change in the order of 00→11→11→11→11→10→10→1, and the translation frequency is low.

According to the analyses of Tables 1 and 2, the first translation unit 210 performs the analysis to obtain the correlation between the de-interlacing instruction and the memory address corresponding to the MPEG control instruction. That is, in the memory addresses corresponding to the de-interlacing instructions, the bits with the highest translation frequency are the $9^{th}$ and $10^{th}$ bits, while the $7^{th}$ and $8^{th}$ bits have the lower translation frequencies. However, the memory addresses corresponding to the MPEG control instructions have the opposite properties, wherein the bits with the highest translation frequency are the $7^{th}$ and $8^{th}$ bits, while the $9^{th}$ and $10^{th}$ bits have the lower translation frequencies. Therefore, a linear translation formula may be obtained, by way of analysis, in the following Equation F(x).

$$F(x)=(addr(10) \otimes addr(8), addr(9) \otimes Addr(7))$$

That is, in the memory addresses corresponding to the de-interlacing instructions, the $8^{th}$ and $10^{th}$ bits, counted from the least significant bit serving as the $0^{th}$ bit are XORed, and the $7^{th}$ and $9^{th}$ bits are XORed, wherein the obtained results serve as the bank addresses corresponding to the de-interlacing instructions. Table 3 lists the memory addresses corresponding to the de-interlacing instructions of Table 1 after the linear translation.

TABLE 3

| De-interlacing instruction | Memory address | | | | Bank address |
|---|---|---|---|---|---|
| | Bit 10 | Bit 9 | Bit 8 | Bit 7 | |
| 1 | 0 | 0 | 0 | 0 | 00 |
| 2 | 1 | 1 | 0 | 0 | 11 |
| 3 | 1 | 0 | 0 | 0 | 10 |
| 4 | 0 | 1 | 0 | 0 | 01 |
| 5 | 0 | 1 | 0 | 0 | 01 |
| 6 | 0 | 0 | 0 | 0 | 00 |
| 7 | 1 | 1 | 0 | 0 | 11 |
| 8 | 1 | 0 | 0 | 0 | 10 |
| ... | ... | ... | ... | ... | ... |

In addition, in the memory addresses corresponding to the MPEG control instructions, the $8^{th}$ and $10^{th}$ bits, counted from the least significant bit serving as the $0^{th}$ bit are XORed, and the $7^{th}$ and $9^{th}$ bits are XORed, wherein the obtained results serve as the bank addresses corresponding to the MPEG control instructions. Table 4 lists the memory addresses corresponding to the de-interlacing instructions of Table 2 after the linear translation.

TABLE 4

| MPEG control instruction | Memory address | | | | Bank address |
|---|---|---|---|---|---|
| | Bit 10 | Bit 9 | Bit 8 | Bit 7 | |
| 1 | 0 | 0 | 0 | 0 | 00 |
| 2 | 1 | 1 | 1 | 1 | 00 |
| 3 | 1 | 1 | 1 | 0 | 01 |
| 4 | 1 | 1 | 0 | 1 | 10 |
| 5 | 1 | 1 | 0 | 0 | 11 |
| 6 | 1 | 0 | 1 | 1 | 01 |
| 7 | 1 | 0 | 1 | 0 | 00 |
| 8 | 1 | 0 | 0 | 1 | 11 |
| ... | ... | ... | ... | ... | ... |

FIG. 7 is a schematic illustration showing an example of a memory address, translated according to a de-interlacing instruction according to the preferred embodiment of the invention. FIG. 8 is a schematic illustration showing a memory address, translated according to a MPEG control instruction, according to the preferred embodiment of the invention. As shown in FIG. 7, after the translation is performed by the first translation unit 210, the bank addresses corresponding to the any two adjacent de-interlacing instructions are different. As shown in FIG. 8, it is obtained that the bank addresses corresponding to the any two adjacent MPEG control instructions are different after the translation is performed by the first translation unit 210. That is, the possibility that the bank address is hit is decreased, such that the conditions that the page address is not hit but the bank address is hit are decreased when the memory 400 is switching the access address. Thus, the pipeline method may be utilized to enhance the bandwidth availability of the overall system.

The step S610 substantially analyzes the address regularity of accessing the memory 400 between the adjacent request instructions of the element, which needs a lot of bandwidth, to find the bit with the high translation frequency and linearly translate the bit into the bank address, such that the bank address between the adjacent request instructions is frequently translated. The original conditions that the page address is not hit but the bank address is hit are translated into the conditions that the page address is not hit and the bank address is not hit. The properties of the request instructions can be processed in a pipeline manner according to the conditions that the bank address is not hit, so that the loss of the memory performance can be decreased, and the bandwidth can be effectively utilized.

However, after the bank address of the request instruction is reassigned, the bandwidth usage is increased, and the interval time between the adjacent request instructions is shortened. The memory controller 200 transmits the memory address to the memory 400 in a single-end output manner rather than the differential manner. So, when the continuous memory addresses, transmitted by the memory controller 200, need to carry, most of the bits simultaneous change to cause the current to instantaneously significantly change, and thus affect the electric property, such that the translation speed between the logic 1 and the logic 0 is decreased, and the memory 400 cannot normally work at the higher speed. When the bandwidth is sufficiently used, the interval time between the adjacent request instructions is shortened, the conditions that most bits simultaneously change become more frequent, and the influence on the working speed of the memory 400 becomes greater.

If BW(x) is the system bandwidth, C(x) represents the working speed of the memory 400, W(x) represents the data channel width of the memory 400, U(x) represents the bandwidth usage of the memory 400 and O(x) represents the load loss caused when the CPU 360 accesses the data, then the system bandwidth BW(x) may be represented by:

$$BW(x)=C(x)\times W(x)\times U(x)-O(x).$$

Moreover, it is assumed that the data channel width of the memory 400 is equal to 16 bits, the original working speed is equal to 800 MHz, the bandwidth usage is 60%, and the load loss when the CPU 360 accesses the data is equal to 100 MB/s, then the original system bandwidth $BW_1(x)$ is equal to 800 MHz×2 bytes×60%−100 MB/s=860 MB/s. After the first translation unit 210 has translated the bank address, it is assumed that the bandwidth usage is increased to 85%. However, the instantaneously high current cannot be effectively solved such that the memory 400 has the problem of the sampling error. So, the working speed has to be reduced to 600 MHz, and the system bandwidth after the adjustment of step S610 is equal to $BW_2(x)$=600 MHz×2 bytes×85%−100 MB/s=920 MB/s.

Comparing $BW_1(x)$ with $BW_2(x)$, it is found that the increase of the system performance is not large. However, if the problem of the instantaneously high current can be solved such that the working speed needs not to be reduced and can be kept at 800 MHz, the system bandwidth may be obtained as $BW_3(x)$=800 MHz×2 bytes×85%−100 MB/s=1260 MB/s. Thus, the system performance can be significantly enhanced. In order to solve the problem of the instantaneously high current, the second translation unit 220 utilizes a numerical translation mechanism to translate the memory addresses corresponding to the request instructions in step S620, such that the memory addresses corresponding to the any two adjacent request instructions have less different bits. The numerical translation may be, for example, a Gray code translation, which can make the memory addresses corresponding to the any two adjacent request instructions fluctuate only one bit. However, the invention is not limited thereto, and any numerical translation method, which can reduce the fluctuated bit number, can be applied.

FIG. 9 is a schematic illustration showing an example of a memory address, Gray-code translated according to a request instruction, according to the preferred embodiment of the invention. As shown in FIG. 9, it is found that, even though most bits of the memory addresses corresponding to the adjacent request instructions will change before the translation, only one bit is changed after translation. Consequently, even if the memory addresses are transmitted in a single-end output manner, the stable current still can be maintained, such that the memory 400 can be kept at the high working speed without being adjusted.

The adaptive memory address translation method and the memory controller according to the embodiment of the invention have many advantages, some of which will be listed in the following.

In the adaptive memory address translation method and the memory controller of the invention, the memory addresses are translated, such that the bank addresses between the adjacent request instructions frequently change. So, the loss of the memory performance can be reduced according to the properties that the request instructions can be processed in the pipeline manner as the bank address is not hit. Thus, the loss can be reduced, such that the bandwidth can be effectively and sufficiently utilized.

Moreover, after the memory addresses are re-translated, the interval time between the adjacent request instructions is shortened corresponding to the sufficiently utilized bandwidth. Therefore, a numerical translation is utilized to code the memory addresses again, such that the memory addresses corresponding to the adjacent request instructions have less different bits, the stable working current can be kept, and the signal transmitting quality and the overall system performance can be enhanced. Thus, the maximum system bandwidth can be obtained at the high bandwidth and the low voltage.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adaptive memory address translation method, comprising:
    receiving a plurality of request instructions, wherein a memory address corresponding to each of the request instructions comprises a bank address;
    analyzing the memory addresses corresponding to the request instructions to obtain a translation frequency of each bit in the memory addresses, wherein the translation frequency of each bit represents how frequent the bit changes value in the memory addresses;
    determining a linear translation formula according to the obtained translation frequency of bits in the memory addresses;
    performing a first translation of the memory addresses corresponding to the request instructions according to the linear translation formula, such that the number of identical bank addresses between two adjacent request instructions is fewer than that before the first translation; and
    utilizing a numerical translation mechanism to perform a second translation of the memory addresses corresponding to the request instructions, such that the memory addresses corresponding to the any two adjacent request instructions have fewer different bits than those before the second translation.

2. The method according to claim 1, wherein the linear translation formula relates to a memory bit having a highest translation frequency in the memory addresses corresponding to the request instructions.

3. The method according to claim 1, wherein the numerical translation mechanism is a Gray code translation.

4. A memory controller, comprising:
    a first translation unit for receiving a plurality of request instructions, wherein a memory address corresponding to each of the request instructions comprises a bank address, the first translation unit analyzes the memory addresses corresponding to the request instructions to obtain a translation frequency of each bit in the memory addresses, determines a linear translation formula according to the obtained translation frequency of bits in the memory addresses, and performs a first translation of the memory addresses corresponding to the request instructions according to the linear translation formula, such that the number of identical bank addresses between two adjacent request instructions is fewer than that before the first translation; and
    a second translation unit for utilizing a numerical translation mechanism to perform a second translation of the memory addresses corresponding to the request instructions, such that the memory addresses corresponding to the any two adjacent request instructions have fewer different bits than those before the second translation, wherein the translation frequency of each bit represents how frequent the bit changes value in the memory addresses.

5. The memory controller according to claim 4, wherein the linear translation formula relates to a memory bit having a highest translation frequency in the memory addresses corresponding to the request instructions.

6. The memory controller according to claim 4, wherein the numerical translation mechanism utilized by the second translation unit is a Gray code translation.

\* \* \* \* \*